(12) United States Patent
McCullen

(10) Patent No.: US 8,538,825 B2
(45) Date of Patent: Sep. 17, 2013

(54) PURCHASE INFORMATION NOTIFICATION SYSTEM, METHOD, AND PROGRAM PRODUCT

(75) Inventor: Kevin W. McCullen, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 12/872,840

(22) Filed: Aug. 31, 2010

(65) Prior Publication Data

US 2012/0054073 A1    Mar. 1, 2012

(51) Int. Cl.
*G06Q 30/00*    (2012.01)
(52) U.S. Cl.
USPC ............................................ 705/26.1
(58) Field of Classification Search
USPC ................................. 705/26.1, 27.1
See application file for complete search history.

(56) References Cited

U.S. PATENT DOCUMENTS

| | | | |
|---|---|---|---|
| 5,960,411 A | 9/1999 | Hartman et al. | |
| 7,970,669 B1* | 6/2011 | Santos | 705/30 |
| 2002/0055911 A1 | 5/2002 | Guerreri | |
| 2002/0147690 A1 | 10/2002 | Tam et al. | |
| 2005/0192870 A1* | 9/2005 | Geddes | 705/26 |
| 2006/0122899 A1 | 6/2006 | Lee et al. | |
| 2006/0190328 A1 | 8/2006 | Singh et al. | |
| 2007/0100749 A1* | 5/2007 | Bachu et al. | 705/42 |
| 2007/0203803 A1 | 8/2007 | Stone et al. | |
| 2008/0040261 A1 | 2/2008 | Nix et al. | |
| 2008/0288360 A1 | 11/2008 | Woolard | |
| 2010/0010918 A1 | 1/2010 | Hunt | |
| 2010/0057574 A1 | 3/2010 | Banerjee et al. | |
| 2011/0041169 A1* | 2/2011 | De Luca | 726/7 |

OTHER PUBLICATIONS

Business Editors/High-teach Writers, "HSBC Selects iPIN to Power its iPAY@hsbc Service; Leaders Join Forces to Offer Global Solutions," Business Wire, Jun. 11, 2001, p. 1.*
Unknown, IBM Technical Disclosure, "Method and System for Providing Real Time Budget Advice to a Consumer During an Online Transaction", Sep. 11, 2009.

* cited by examiner

*Primary Examiner* — Brandy A Zukanovich
(74) *Attorney, Agent, or Firm* — Richard M. Kotulak; Hoffman Warnick LLC

(57) ABSTRACT

A method, system, and computer program product for informing a user of purchase information in an online purchase situation are disclosed. In one embodiment, a method includes determining whether an activation device indicator is within a predetermined proximity of a purchase-initiating button in a web browser; and initiating a tip message displaying the purchase information including at least one of: an historical balance, an existing balance, an available amount of credit, or a payment method.

19 Claims, 4 Drawing Sheets

PURCHASE INFORMATION NOTIFICATION SYSTEM, METHOD, AND PROGRAM PRODUCT

BACKGROUND

The disclosure relates generally to informing a user of purchase information in an online purchase situation. More particularly, the disclosure relates to providing a notification message to a user indicating purchase information at a purchase screen in an online purchase situation.

As a greater number of purchases are made through web-based vendors or outlets, tracking and processing of personal financial information becomes more important. Current approaches for monitoring purchase information and notifying users of purchase information may be cumbersome and disjointed.

SUMMARY

A first aspect of the disclosure provides a method for providing notification of purchase information, the method comprising: determining whether an activation device indicator is within a predetermined proximity of a purchase-initiating button in a web browser; and initiating a tip message displaying the purchase information including at least one of: an historical balance, an existing balance, an available amount of credit, or a payment method.

A second aspect of the disclosure provides a computer program comprising program code embodied in at least one computer readable storage medium, which when executed, enables a computer system to implement a method for providing notification of purchase information, the method comprising: determining whether a activation device indicator is within a predetermined proximity of a purchase-initiating button in a web browser; and initiating a tip message displaying the purchase information including at least one of: an historical balance, an existing balance, an available amount of credit, or a payment method.

A third aspect of the disclosure provides a computer system for providing notification of purchase information, the computer system comprising: a component configured to determine whether a user's activation device indicator is within a predetermined proximity of a purchase-initiating button in a web browser; and a component configured to initiate a tip message displaying the purchase information including at least one of: an historical balance, an existing balance, an available amount of credit, or a payment method.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
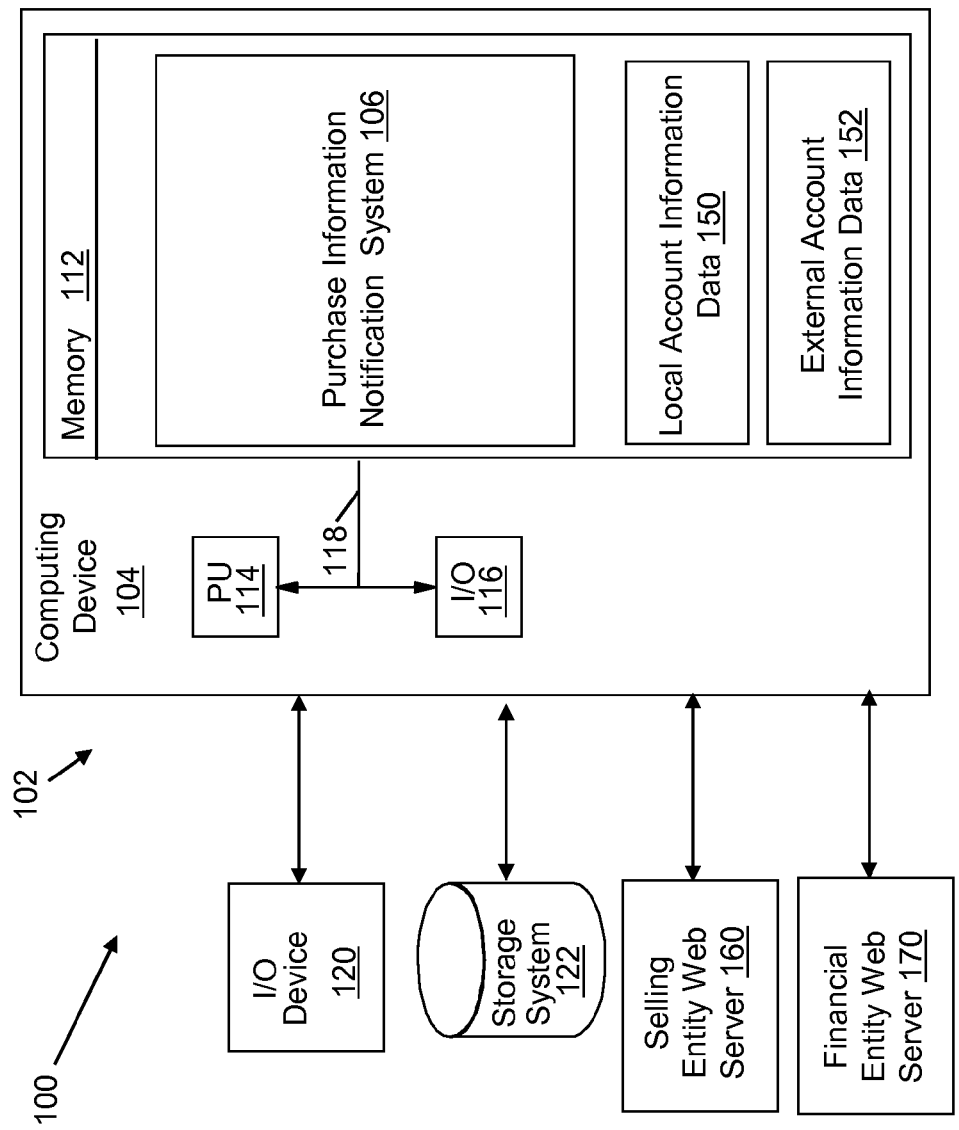
FIG. 1 shows a computational system suited for enablement of the disclosed methodology.

It is noted that the drawings of the disclosure are schematical in nature and not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

The disclosure provides solutions for notifying a user about current purchase information, account balance(s) and/or historical spending through one or more vendors at a point of sale. Specifically, the disclosure includes a method for providing a notification of purchase information, where the method includes: determining whether an activation device indicator is within a predetermined proximity of a purchase-initiating button in a web browser; and initiating a tip message displaying the purchase information including at least one of: an historical balance, an existing balance, an available amount of credit, and a payment method. It is understood that the teachings of this disclosure may be applied to any of a number of user-interface based purchases.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "module" or "system." Furthermore, the present disclosure may take the form of a computer program product embodied in any tangible medium of expression having computer-usable program code embodied in the medium.

Any combination of one or more computer readable medium(s) may be utilized. The computer readable medium may be a computer readable storage medium or a computer readable signal medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any tangible medium that can contain or store a program for use by or in conjunction with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present disclosure may be written in any combination of one or more programming languages, including an object oriented programming language such as Java, Smalltalk, C++ or the like, conventional procedural programming languages, such as the "C" programming language or similar programming languages, and conventional interpreted languages, such as perl, tcl python or similar interpreted languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments taught herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1 there is depicted an illustrative environment 100 including a system for providing purchase information notifications. To this extent, environment 100 includes a computer infrastructure 102 that can perform the various process steps described herein for providing purchase information notifications. In particular, computer infrastructure 102 is shown including a computing device 104 that comprises a purchase information notification system 106, which enables computing device 104 to implement a method for providing purchase information notifications by performing the process steps of the disclosure.

Computing device 104 is shown including a memory 112, a processor (PU) 114, an input/output (I/O) interface 116, and a bus 118. Further, computing device 104 is shown in communication with an external I/O device/resource 120 and a storage system 122. As is known in the art, in general, processor 114 executes computer program code, such as that for a purchase information notification system 106, that is stored in memory 112 and/or storage system 122. While executing computer program code, processor 114 can read and/or write data, such as local account information data 150 and/or external account information data 152, to/from memory 112, storage system 122, and/or I/O interface 116 (which may be connected to one or more servers, e.g., a selling entity web server 160 and/or a financial entity web server 170). Bus 118 provides a communications link between each of the components in computing device 104. I/O device 120 can comprise any device that enables a user to interact with computing device 104 or any device that enables computing device 104 to communicate with one or more other computing devices such as a graphical user interface (GUI), a touch-screen or other display. Input/output devices (including but not limited to keyboards, displays, pointing devices, touch screens, etc.) can be coupled to the system either directly or through intervening I/O controllers.

In any event, computing device 104 can comprise any general purpose computing article of manufacture capable of executing computer program code installed by a user (e.g., a personal computer, server, handheld device, etc.). However, it is understood that computing device 104 and purchase information notification system 106 are only representative of various possible equivalent computing devices that may perform the various process steps of the disclosure. To this extent, in other embodiments, computing device 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 102 is only illustrative of various types of computer infrastructures for implementing the disclosure. For example, in one embodiment, computer infrastructure 102 comprises two or more computing devices (e.g., a server cluster) that communicate over any type of wired and/or wireless communications link, such as a network, a shared memory, or the like, to perform the various process steps of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques.

Figure 2:
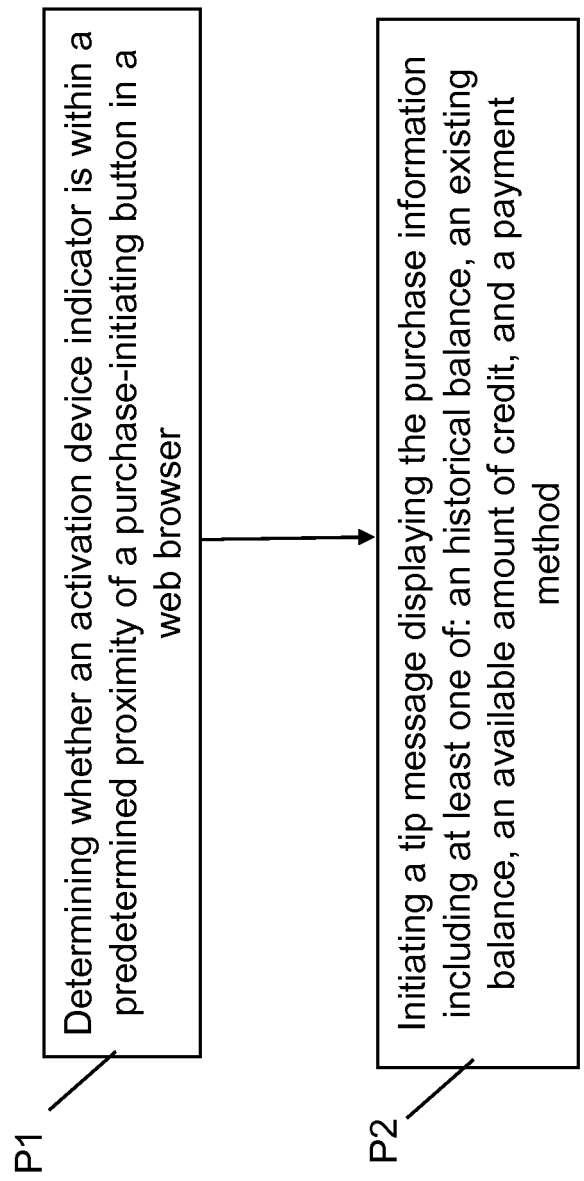
FIG. 2 shows a flow diagram of one set of steps consistent with the disclosed methodology and process used in embodiments.

FIG. 2 depicts a process flow diagram in accordance with an embodiment. In process P1, purchase information notification system 106 may determine whether an activation device indicator is within a predetermined proximity of a purchase-initiating button in a web browser. For example, turning to FIG. 3, a schematic representation of a web page 200 displayed by a web browser 210 is shown according to an embodiment. This representation of web page 200 may include numerous buttons 220 and active links 230 which may be actuated via an activation device indicator. At least one button 220 may be a purchase-initiating button 222. Actuating purchase initiating button 222 may initiate a purchase of one or more items via, e.g., a debit from an existing localized account, a charge to an external credit card account, or a direct transfer of funds from a bank account. Actuating purchase initiating button 222 may bring the user to a follow-up or confirmation page, where the actual deduction or charging of funds must be confirmed via another step (e.g., via entering account information or actuating another purchase-initiating button). That is, in any given transaction, a user may be required to actuate a number of purchase initiating buttons 222 in order to complete the transaction. It is understood that the teachings of this disclosure may apply to one or more of the purchase initiating buttons 222 presented for actuation in any given transaction.

Figure 3:
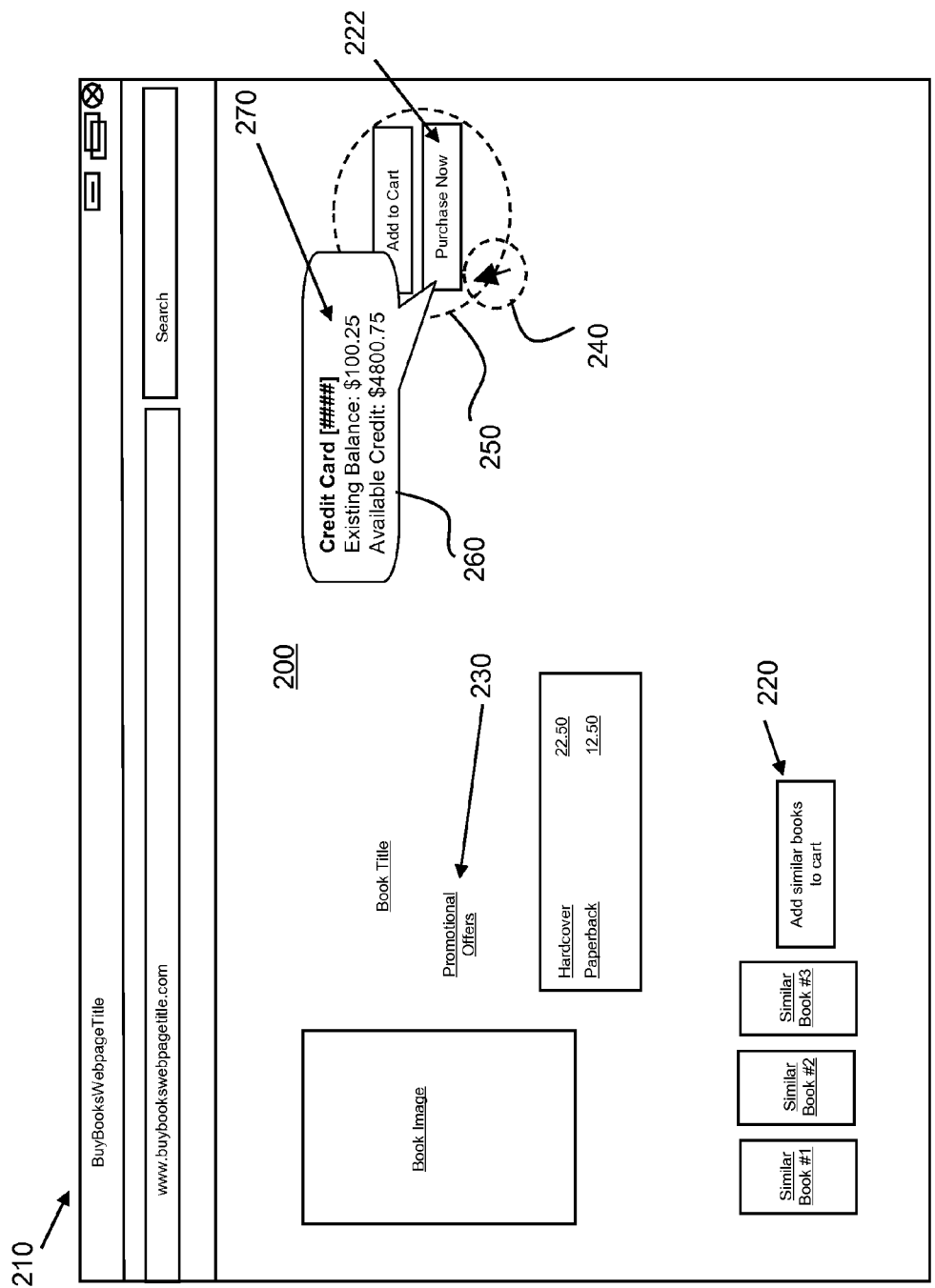
FIG. 3 shows an illustrative schematic view of a web browser according to embodiments.

With continuing reference to FIG. 3, in one embodiment, the activation device indicator may be a mouse icon 240 (shown surrounded by phantom circle for ease of reference). However, it is understood that activation device indicator may be any indicator corresponding to an activation device. It is understood that activation devices may include any number of mechanisms for activating a purchase-initiating button, for example, one or more of a computer mouse, a computer keyboard or other controller, a pointer, a human finger or hand, etc. Therefore, teachings of the disclosure may include determining whether a finger is approaching a purchase-initiating button 222 on a touch screen, or whether a purchase-initiating button 222 is highlighted via keyboard tabbing through a web page 200. It is understood that a number of activation device indicators may be used according to aspects of the disclosure.

In any case, purchase information notification system 106 may determine whether an activation device indicator (e.g., mouse icon 240) is within a predetermined proximity 250 (arbitrarily indicated by a phantom circle) of a purchase-initiating button 222 in web browser 210. Where this determination is positive, purchase information notification system 106 may initiate process P2 (FIG. 2), including: initiating a tip message displaying the purchase information including at least one of: an historical balance, an existing balance, an available amount of credit, or a payment method. Returning to FIG. 3, the activation device indicator (e.g., mouse icon 240) is shown within predetermined proximity 250 of purchase-initiating button 222. In response to the mouse icon 240 entering the predetermined proximity (area) 250, a tip message 260 is displayed.

Tip message 260 may be a dialogue box (e.g., a pop-up dialogue box) originating from at least one of: a displayed order amount, a displayed payment type, or a purchase-initiating button (e.g., purchase-initiating button 222). In the embodiment shown in FIG. 3, tip message 260 is a dialogue box displayed within a border of the web browser 210. Where, for example, a confirmation page is displayed, tip message 260 may include a dialogue box originating from the displayed order amount, the displayed payment type, or an order confirmation button. Tip message 260 may display purchase information 270 such as an historical balance, an existing balance, an available amount of credit, a payment method, etc.

Figure 4:
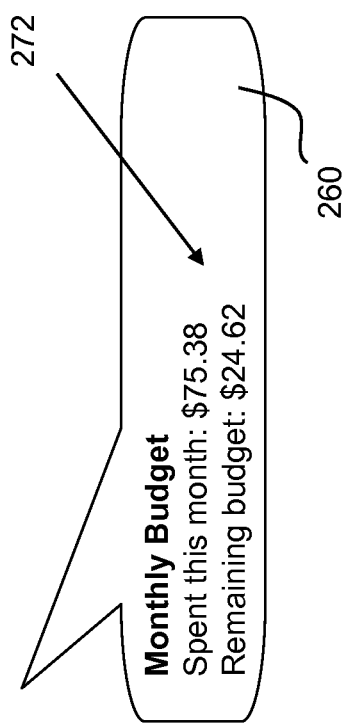
FIG. 4 shows an illustrative tip message according to an embodiment.

FIG. 4 shows one example of a tip message 260 including historical balance information 272. Historical balance information 272 may include one or more of an amount spent over a period (e.g., dollars spent in a month, week, day, year, etc.), a remaining budget over the same or another period, an amount spent through a particular web page (e.g., web page 200 of FIG. 3) over the same or another period, a number of purchases made over the same or another period, a difference in spending between a given period and a distinct period, etc.

Historical balance information 272 may be retrieved from local account information data 150 and/or external account information data 152. For example, local account information data 150 may be information stored at a web server managed by the selling entity (selling entity web server 160, FIG. 1), at the user's device or at another location where the purchase information notification system 106 may have real-time access to this information. Local account information data 150 may, for example, be managed and/or stored by the provider of the web page 200 at selling entity web server 160, and therefore, may be easily obtained by the provider of the web page 200 without additional security measures. Local account information data 150 may include data entered by a user regarding, e.g., a monthly budget for purchases through web page 200. External account information data 152 may include, for example, credit card account information (e.g., balances, payments, etc.), bank account information (e.g., account types, balances, etc.) and any other data used in displaying purchase information that is managed by an external entity. In some embodiments, external account information data 152 may be managed by a finance company (e.g., bank or credit card company) at a financial entity web server 170 (FIG. 1). Obtaining this external account information data 152 from the financial entity (e.g., bank or credit card company) or a data manager associated with the financial entity may require one or more conventional authorization methods, the descriptions of which are omitted herein for brevity. However, a difference between external account information data 152 and local account information data 150 is that local account information data 150 is managed in such a way that it may be easily obtained in real time (e.g., as account information changes to due a purchase).

In some embodiments, external account information data 152 may be obtained via an authorization process that may include a time delay. In this embodiment, purchase information notification system 106 may obtain (e.g., download) external account information data 152, when available, on a periodic basis. This quasi-real-time approach may include obtaining external account information data 152 on an hourly, daily, weekly, etc. basis. In this case, purchase information notification system 106 may use both external account information data 152 and local account information data 150 to provide purchase information 270. For example, external account information data 152 may be obtained by purchase information notification system 106 on a daily basis (e.g., at 12:01 AM EST). During that same day, a user may purchase one or more items via webpage 200, thereby changing local account information data 150. The changes in local account information data 150 for the day may be compared with external account information data 152, to provide updated purchase information. This updated purchase information is estimated based upon the external account information data 152 provided at the time of download. Therefore, this quasi-real time updated purchase information may be inaccurate (e.g., where purchases were made from the account corresponding to external account information data 152 through another webpage not managed by the selling entity web server 160). However, this quasi-real-time updated purchase information may reduce a delay associated with authenticating connections between purchase information notification system 106 and financial entity web server 170.

It is understood that in one embodiment, purchase information notification system 106 may perform the determining and initiating (FIG. 2) via a browser plug-in (e.g., for Mozilla Firefox, Microsoft Internet Explorer, etc.). The browser plug-in may be configured to determine whether a purchase screen is active and/or displayed on a user interface (e.g., a display screen), and retrieve the purchase information 270 from local account information data 150 and/or external account information data 152 if the determination is positive.

As discussed herein, various systems and components are described as "obtaining" data (e.g., local account information data 150, external account information data 152) is obtained/received into the system 102, etc.). It is understood that the corresponding data can be obtained using any solution. For example, the corresponding system/component can generate and/or be used to generate the data, retrieve the data from one or more data stores (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

The foregoing flowchart and block diagram drawings in the Figures illustrate the architecture, functionality, and operation of possible implementations of systems, methods and computer program products according to various several embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. Also, one of ordinary skill in the art will recognize that additional blocks that describe the processing may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for providing notification of purchase information, performed using at least one computing device, the method comprising:
    determining whether an activation device indicator is within a predetermined proximity of a purchase-initiating button in a web browser using the at least one computing device; and
    initiating a tip message displaying the purchase information including an historical balance for an account in response to the activation device indicator entering the predetermined proximity of the purchase-initiating button in the web browser,
    wherein the historical balance is retrieved from local account information data stored by a provider of the web browser at a selling entity web server,
    wherein the historical balance includes historical balance information including an amount spent using an associated account within a period, and wherein the predetermined proximity is defined as the approximate display boundary of the purchase-initiating button.

2. The method of claim 1, wherein the purchase-initiating button is a purchase confirmation button.

3. The method of claim 1, wherein the determining and initiating are performed using a browser plug-in, wherein the browser plug-in further performs the following:
    determines whether a purchase screen is displayed on a display; and
    retrieves the purchase information from a localized account in response to determining the purchase screen is displayed on the display.

4. The method of claim 1, wherein the purchase information further includes:
    external account information data obtained on a daily basis, and
    wherein the historical balance changes based upon a user purchase at the web browser.

5. The method of claim 4, further comprising updating the purchase information in response to the user purchase using the external account information data and the changed historical balance prior to the initiating of the tip message.

6. The method of claim 5, wherein the updating includes estimating the updated purchase information prior to the initiating of the tip message.

7. A computer program product comprising program code embodied in at least one non-transitory computer readable storage medium, which when executed, enables a computer system to implement a method for providing notification of purchase information, the method comprising:
    determining whether a activation device indicator is within a predetermined proximity of a purchase-initiating button in a web browser; and
    initiating a tip message displaying the purchase information including an historical balance for an account in response to the activation device indicator entering the predetermined proximity of the purchase-initiating button in the web browser,
    wherein the historical balance is retrieved from local account information data stored by a provider of the web browser at a selling entity web server,
    wherein the historical balance includes historical balance information including an amount spent using an associated account within a period, and wherein the predetermined proximity is defined as the approximate display boundary of the purchase-initiating button.

8. The computer program product of claim 7, wherein the purchase-initiating button is a purchase confirmation button.

9. The computer program product of claim 7, wherein the determining and initiating are performed using a browser plug-in, wherein the browser plug-in further performs the following:
   determines whether a purchase screen is displayed on a display; and
   retrieves the purchase information from a localized account in response to determining the purchase screen is displayed on the display.

10. The computer program product of claim 7, wherein the tip message is a pop-up dialogue box originating from and overlying the purchase-initiating button.

11. The computer program product of claim 7, wherein the purchase information further includes:
   external account information data obtained on a daily basis, and
   wherein the historical balance changes based upon a user purchase at the web browser.

12. The computer program product of claim 11, which when executed, enables the computer system to further implement:
   updating the purchase information in response to the user purchase using the external account information data and the changed historical balance prior to the initiating of the tip message.

13. The computer program product of claim 12, wherein the updating includes estimating the updated purchase information prior to the initiating of the tip message.

14. A computer system comprising:
   at least one computing device configured to provide notification of purchase information, the at least one computing device including:
      a component configured to determine whether a user's activation device indicator is within a predetermined proximity of a purchase-initiating button in a web browser; and
      a component configured to initiate a tip message displaying the purchase information including an historical balance for an account in response to the activation device indicator entering the predetermined proximity of the purchase-initiating button in the web browser,
   wherein the historical balance is retrieved from local account information data stored by a provider of the web browser at a selling entity web server,
   wherein the historical balance includes historical balance information including an amount spent using an associated account within a period, and wherein the predetermined proximity is defined as the approximate display boundary of the purchase-initiating button.

15. The computer system of claim 14, wherein the purchase-initiating button is a purchase confirmation button.

16. The computer system of claim 14, wherein the component configured to determine and the component configured to initiate include a browser plug-in.

17. The computer system of claim 16, wherein the browser plug-in further performs the following:
   determines whether a purchase screen is displayed on a display; and
   retrieves the purchase information from one of a localized account in response to determining the purchase screen is displayed on the display.

18. The computer system of claim 14, wherein the purchase information further includes:
   external account information data obtained on a daily basis, and
   wherein the historical balance changes based upon a user purchase at the web browser.

19. The computer system of claim 18, wherein the component configured to initiate the tip message is further configured to:
   update the purchase information in response to the user purchase using the external account information data and the changed historical balance prior to the initiating of the tip message,
   wherein the updating includes estimating the updated purchase information prior to the initiating of the tip message.

* * * * *